(12) United States Patent
Ding et al.

(10) Patent No.: US 11,507,228 B2
(45) Date of Patent: Nov. 22, 2022

(54) ACOUSTIC WAVE SIGNAL READING CIRCUITS, CONTROL METHODS, AND ACOUSTIC WAVE SIGNAL READING APPARATUSES

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Bo Chen, Beijing (CN); Yanling Han, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/605,204

(22) PCT Filed: May 13, 2019

(86) PCT No.: PCT/CN2019/086668
§ 371 (c)(1),
(2) Date: Oct. 14, 2019

(87) PCT Pub. No.: WO2020/062885
PCT Pub. Date: Apr. 2, 2020

(65) Prior Publication Data
US 2021/0333903 A1 Oct. 28, 2021

(30) Foreign Application Priority Data
Sep. 29, 2018 (CN) .......................... 201811152708.3

(51) Int. Cl.
*G06F 3/043* (2006.01)
*G06F 3/041* (2006.01)
*G06V 40/13* (2022.01)

(52) U.S. Cl.
CPC .......... *G06F 3/043* (2013.01); *G06F 3/04166* (2019.05); *G06V 40/1306* (2022.01)

(58) Field of Classification Search
CPC .... G06F 3/043; G06F 3/04166; G06F 3/0416; G06V 40/1306
See application file for complete search history.

(56) References Cited

U.S. PATENT DOCUMENTS

2004/0239651 A1 12/2004 Sakurai
2012/0288121 A1 11/2012 Matsui et al.
(Continued)

FOREIGN PATENT DOCUMENTS

CN 2260024 Y 8/1997
CN 2550215 Y 5/2003
(Continued)

OTHER PUBLICATIONS

ISA National Intellectual Property Administration of the People's Republic of China, International Search Report Issued in Application No. PCT/CN2019/086668, dated Jul. 31, 2019, WIPO, 3 pages.
(Continued)

*Primary Examiner* — Jonathan A Boyd
(74) *Attorney, Agent, or Firm* — McCoy Russell LLP

(57) ABSTRACT

Embodiments of the present application provide acoustic wave signal reading apparatuses, acoustic wave signal reading circuits, and control methods thereof related to the field of acoustic wave signal reading technology. One embodiment of an acoustic wave signal reading circuit comprises: an acoustic wave receiver, a reset control circuit, a function circuit, and an output circuit; an acoustic wave receiver is configured to convert a received acoustic wave signal into an electrical signal and outputs the electrical signal to a first node; the reset control circuit outputs a voltage to the first node; the function circuit switches states based on the first
(Continued)

node, a signal terminal, and a voltage terminal, and outputs a voltage to a second node to reset the second node or amplifies a potential of the first node and outputs to the amplified potential to the second node depending on a state of the function circuit.

20 Claims, 7 Drawing Sheets

(56) References Cited

U.S. PATENT DOCUMENTS

| | | | | |
|---|---|---|---|---|
| 2014/0023210 | A1* | 1/2014 | Sheng | H04R 29/00 381/114 |
| 2015/0277660 | A1 | 10/2015 | Yang et al. | |
| 2017/0285877 | A1 | 10/2017 | Hinger | |
| 2020/0193118 | A1* | 6/2020 | Ding | G06V 40/1306 |

FOREIGN PATENT DOCUMENTS

| | | | | |
|---|---|---|---|---|
| CN | 101339477 | A | | 1/2009 |
| CN | 102779429 | A | | 11/2012 |
| CN | 106156741 | A | | 11/2016 |
| CN | 206461599 | U | | 9/2017 |
| CN | 108537179 | | * 9/2018 | ............ G06K 9/00 |
| CN | 108537179 | A | | 9/2018 |
| CN | 109164942 | A | | 1/2019 |

OTHER PUBLICATIONS

ISA National Intellectual Property Administration of the People's Republic of China, Written Opinion of the International Searching Authority Issued in Application No. PCT/CN2019/086668, dated Jul. 31, 2019, WIPO, 5 pages.

State Intellectual Property Office of the People's Republic of China, Office Action and Search Report Issued in Application No. 201811152708.3, dated Jan. 17, 2020, 10 pages. (Submitted with Partial Translation).

* cited by examiner

ACOUSTIC WAVE SIGNAL READING CIRCUITS, CONTROL METHODS, AND ACOUSTIC WAVE SIGNAL READING APPARATUSES

CROSS-REFERENCE TO RELATED APPLICATIONS

The present application is a U.S. National Phase of International Patent Application Serial No. PCT/CN2019/08666 entitled "ACOUSTIC WAVE SIGNAL READING CIRCUITS, CONTROL METHODS, AND ACOUSTIC WAVE SIGNAL READING APPARATUSES," filed on May 13, 2019. International Patent Application Serial No. PCT/CN2019/08666 claims priority to Chinese Patent Application No. 201811152708.3 filed on Sep. 29, 2018. The entire contents of each of the above-referenced applications are hereby incorporated by reference for all purposes.

TECHNICAL FIELD

The present application relates to the field of acoustic wave signal reading technology, acoustic wave signal reading circuits, reading devices, and control methods thereof.

BACKGROUND

With the continuous development of touch technology, more and more ultrasonic touch devices are widely used in peoples' daily life. However, current ultrasonic touch devices often have problems with signal reading. One of the primary problems with current devices is that the read signal is not accurate.

SUMMARY

Embodiments of the present application provide an acoustic wave signal reading circuit, a control method thereof, and a reading device. These embodiments address many of the problems of the conventional art including inaccurate detection of acoustic wave signals.

An embodiment of the present application provides an acoustic wave signal reading circuit, including: an acoustic wave receiver, a reset control circuit, a function circuit, and an output circuit; wherein the acoustic wave receiver is coupled to a first node and the acoustic wave receiver is configured to convert a received acoustic wave signal into an electrical signal and output the electrical signal to the first node; wherein the reset control circuit is coupled to the first node, a first scan signal terminal, and a first signal terminal, and the reset control circuit is configured to output a voltage of the first signal terminal to the first node under the control of the first scan signal terminal; wherein the function circuit is coupled to the first node, a second node, a second signal terminal, and a first voltage terminal, and the function circuit switches states based on the first node, the second signal terminal, and the first voltage terminal; wherein the function circuit outputs a voltage of the second signal terminal to the second node to reset the second node or amplifies a potential of the first node and outputs to the amplified potential to the second node depending on a state of the function circuit; and wherein the output circuit is coupled to the second node and a signal read terminal and the output circuit outputs a following voltage of the second node to the signal read terminal.

Optionally, the acoustic wave signal reading circuit according to claim 1, wherein the function circuit comprises: a switching sub-circuit and an energy storage sub-circuit; wherein the switching sub-circuit is coupled to the first node, the second signal terminal, and the second node, the switching sub-circuit switches between a first state and a second state, and the switching sub-circuit is controlled by the first node, the second signal terminal, and the second node; wherein the energy storage sub-circuit is coupled to the first voltage terminal and the second node; wherein the function circuit clears a charge stored in the energy storage sub-circuit to reset the second node under control of the switching sub-circuit in the first state and the first voltage terminal; and wherein the energy storage sub-circuit is charged and the potential of the first node is amplified and output to the second node under control of the switching sub-circuit in the second state and the first voltage terminal.

Optionally, the switching sub-circuit includes: a first transistor comprising a gate coupled to the first node, a first pole coupled to the second signal terminal, and a second pole coupled to the second node; wherein the energy storage sub-circuit includes: a storage capacitor comprising a first end coupled to the second node and a second end coupled to the first voltage terminal.

Optionally, the reset control circuit includes a second transistor comprising a gate coupled to the first scan signal terminal, a first pole coupled to the first signal terminal, and a second pole coupled to the first node.

Optionally, the output circuit includes: a third transistor comprising a gate coupled to the second node, a first pole coupled to the second voltage terminal, and a second pole coupled to a first pole of a fourth transistor; and the fourth transistor comprising a gate coupled to a second scan signal terminal, and a second pole coupled to the signal read terminal An embodiment of the present application further provides A control method for an acoustic wave signal reading circuit, wherein the control method comprises: a reset phase comprising: inputting a first scan signal to a first scan signal terminal to turn on a reset control circuit and outputting a first voltage input of a first signal terminal to a first node; inputting a reset voltage to a second signal terminal and outputting the reset voltage to a second node under control of the first node and a first voltage terminal to reset the second node via a function circuit; and an acquisition phase comprising: an acoustic wave receiver converting a received acoustic wave into an electrical signal and outputting the electrical signal to the first node; the function circuit amplifying the electrical signal of the first node and outputting the signal to the second node controlled by the second signal terminal and the first voltage terminal; and an output circuit outputting a following voltage of the second node to a signal read terminal under control of the second voltage terminal.

Optionally, the reset phase, the acquisition phase, a second reset phase, and a second acquisition phase are sequentially performed in an acoustic wave signal reading period; and in the first acquisition phase, the acoustic wave receiver converts a peak region signal of the received acoustic wave into a first electrical signal and outputs the first electrical signal to the first node; and in the second acquisition phase, the acoustic wave receiver converts a valley region signal of the received acoustic wave into a second electrical signal and outputs the second electrical signal to the first node.

Optionally, the control method further comprises: obtaining a difference between voltage values of the peak region signal read by the signal read terminal in the first acquisition phase and the valley region signal read by the signal read terminal in the second acquisition phase.

Optionally, during the acoustic wave signal reading period, the peak region signal and the valley region signal of the acoustic wave respectively received during the first acquisition phase and the second acquisition phase are located in a same period of the received acoustic wave.

Optionally, further comprising: during the reset phase, clearing a charge from an energy storage sub-circuit of the function circuit to reset the second node when a switching sub-circuit of the function circuit is in a first state under control of the first node, and a reset voltage input at the second signal terminal is equal to a first voltage of the first voltage terminal; switching sub-circuit switching to a second state under control of the first node; and during the acquisition phase, amplifying and outputting the electrical signal of the first node to the second node.

Optionally, switching the switching sub-circuit from to the second state occurs before the acquisition phase.

An embodiment of the application further provides the acoustic wave receiver in the acoustic wave signal reading circuit is an ultrasonic transducer.

Optionally, the acoustic wave signal reading apparatus is an ultrasonic touch device, and the ultrasonic touch device includes: a plurality of the acoustic wave signal reading circuits arranged in a matrix; wherein all first scan signal terminals of the acoustic wave signal reading circuits located in a same row are coupled to a first scanning line; and wherein all signal read terminals of the acoustic wave signal reading circuits located in a same column are coupled to a read signal line.

Optionally, the acoustic wave signal reading apparatus is configured for fingerprint recognition.

An embodiment of the present application provides nn acoustic wave signal reading apparatus comprising the acoustic wave signal reading circuit.

An embodiment of the present application provides an acoustic wave signal reading circuit, a control method thereof, and a reading device. The acoustic wave signal reading circuit includes: an acoustic wave receiver, a reset control circuit, a function circuit, and an output circuit; the acoustic wave receiver and the first node And coupled to convert the received acoustic wave signal into an electrical signal and output to the first node; the reset control circuit is coupled to the first node, the first scan signal terminal, and the first signal terminal, and is configured to be used in a voltage of the first signal terminal is output to the first node under control of the scanning signal end; the function circuit is coupled to the first node, the second node, the second signal terminal, and the first voltage terminal, and is used in the first node, Under the control of the second signal terminal and the first voltage terminal, the voltage of the second signal terminal is output to the second node to reset the second node; or, the potential of the first node is amplified, and the second node is output; the output circuit and The second node is coupled to the signal read terminal for outputting the following voltage to the second node to the signal read terminal.

Some embodiments of the acoustic wave signal reading circuits disclosed by the present application use a pass through method of reading the signal. In contrast, many conventional systems read directly by following a small voltage follow-up or reading a signal using a current mode. These conventional methods may result in poor accuracy of the read signal due to the small variations in signal being read. In the pass through method of some embodiments of this application, a function circuit is set, and an electrical signal converted by the received acoustic wave signal is first amplified while a reset is realized. Then, the output is read using a voltage following method, thereby reducing the noise and improving the precision of the signal.

BRIEF DESCRIPTION OF THE DRAWINGS

In order to more clearly illustrate the embodiments of the present application and technical solutions, description of the drawings of this application is provided below. The drawings and following description only represent a subset of the potential embodiments of the application.

DETAILED DESCRIPTION

Technical solutions of the embodiments of the present application are clearly and completely described in the following description with reference to the accompanying drawings. The described embodiments are only a part of the embodiments of the present application, but not inclusive of all embodiments. All other embodiments obtained by a person of ordinary skill in the art based on the embodiments of the present application without creative efforts are within the scope of the present application.

Unless otherwise defined, technical terms or scientific terms used in the embodiments of the present application should be construed in the ordinary meaning of those of ordinary skill in the art. The terms "first", "second," and similar terms used in the present application do not denote any order, quantity, or importance, but are merely used to distinguish different components. The word "comprising," "comprises," and the like means that the element or item preceding the word contains or consists of the elements or items following the word. The words "coupled," "connected," and the like are not limited to physical or mechanical coupling, but may include electrical coupling, whether direct or indirect. "Upper," "lower," "left," "right," etc. are only used to indicate relative positional relationship, and when the absolute position of an object to be described is changed, the relative positional relationship may also change accordingly.

Some conventional acoustic wave circuits directly read the signal by using a small voltage following method. In these conventional circuits, the signal may be too small. Other conventional circuits use a current reading method and the signal is externally received. The circuits suffer from coupling interference and other interferences that lead to poor accuracy of the read signal.

Figure 1:
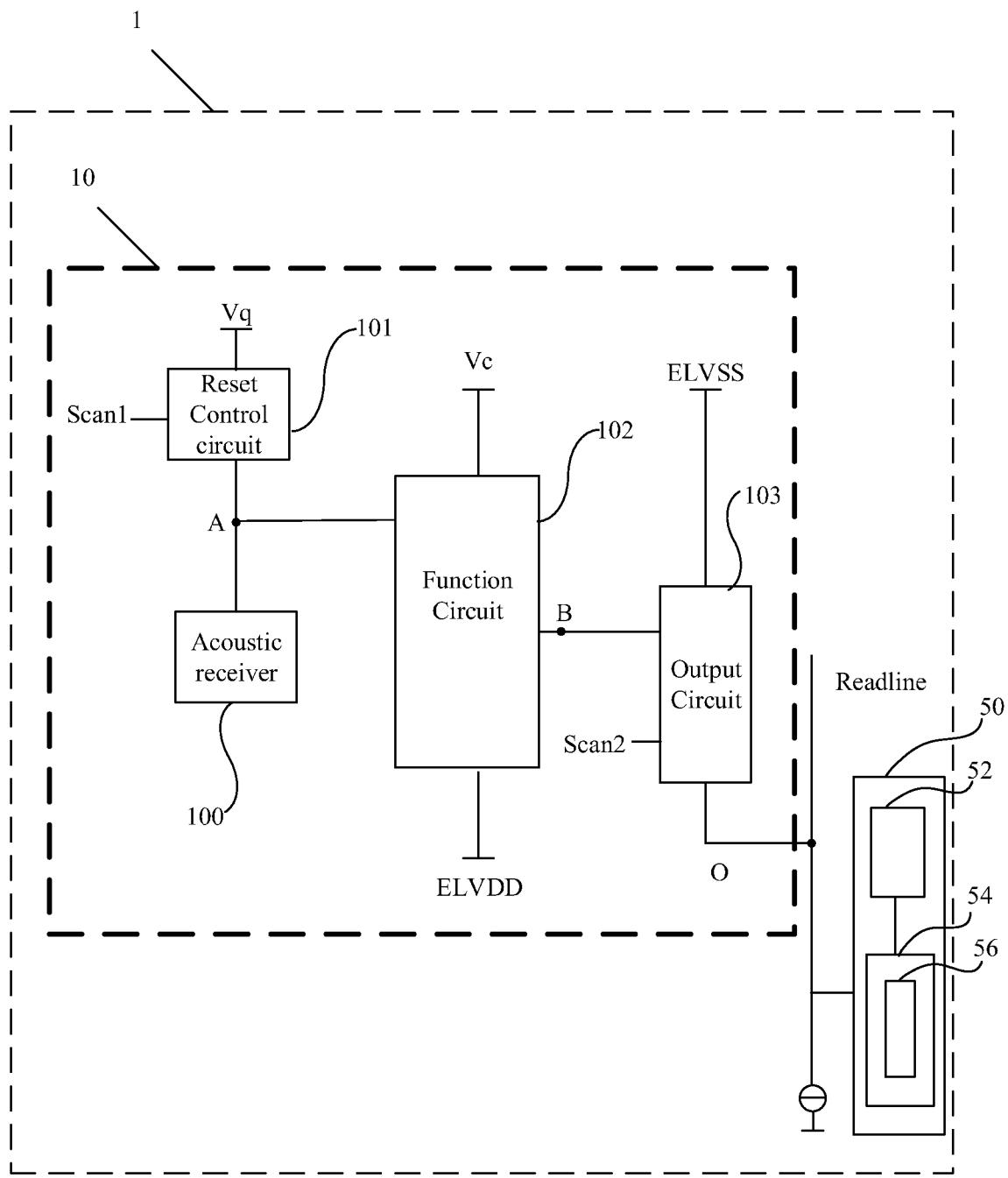
FIG. 1 shows a schematic structural diagram of an acoustic wave signal reading circuit according to an embodiment of the present application.

Embodiments of the present application provide an acoustic wave signal reading circuit. As shown in FIG. 1, the acoustic wave signal reading circuit 10 includes: an acoustic wave receiver 100, a reset control circuit 101, a function circuit 102, and an output circuit 103.

The acoustic wave receiver 100 converts a received acoustic wave signal into an electrical signal and outputs the electrical signal to a first node A. The acoustic wave receiver 100 may be an ultrasonic transducer, which is generally used in the field of ultrasonic touch devices, but is not limited thereto.

The reset control circuit 101 is coupled to the first node A, a first scan signal terminal Scan1, and a first signal terminal Vq. The reset control circuit 101 outputs a voltage of the first signal terminal Vq to the first node A under control of the first scan signal terminal Scan1.

The function circuit 102 is coupled to the first node A, a second node B, a second signal terminal Vc, and a first voltage terminal ELVDD. The function circuit 102 controls the first node A, the second signal terminal Vc, and the first voltage terminal ELVDD. The function circuit 102 performs multiple functions depending on a state of components within the function circuit such as a transistor T1, as described below with reference to FIG. 3. The function circuit 102 outputs a voltage of the second signal terminal Vc to the second node B to reset the second node B. The function circuit 102 also amplifies a potential of the first node A and outputs the amplified potential to the second node B.

The output circuit 103 is coupled to the second node B and a signal read terminal O. The output circuit 103 outputs a following voltage of the second node B to the signal read terminal O.

The signal read terminal O may be coupled to one or more of an IC (Integrated Circuit), power supply circuits, and other components by a read signal line Readline to perform functions such as reading a signal and further processing for applications such as fingerprint acquisition or touch control.

In summary, some conventional acoustic wave signal reading circuits are set by comparing a reading of the signal by a small voltage follow-up or a current mode, resulting in poor accuracy of the read signal. In contrast, an embodiment of the function circuit of the present application realizes a reset, simultaneously amplifies the electric signal of the converted received acoustic wave signal, and then performs output reading by means of voltage follow-up, thereby enhancing the anti-noise ability of the read signal and improving signal precision.

Specific circuit configurations of the above-described reset control circuit 101, function circuit 102, and output circuit 103 will be further described below by way of specific embodiments.

Figure 3:
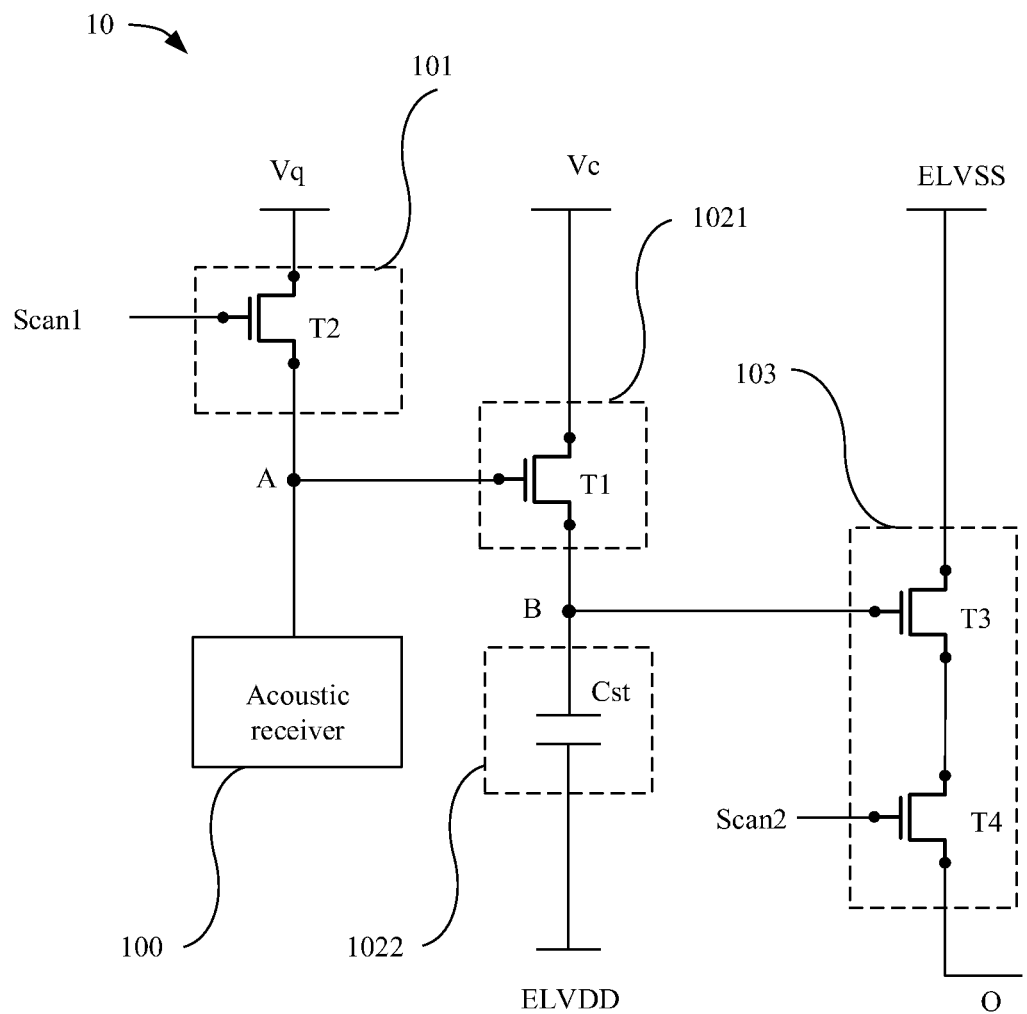
FIG. 3 shows a schematic structural diagram of yet another acoustic wave signal reading circuit according to an embodiment of the present application.

The reset control circuit 101 is shown in FIG. 3. The reset control circuit 101 may include a second transistor T2 comprising a gate coupled to the first scan signal terminal Scan1, a first pole coupled to the first signal terminal Vq, and a second pole coupled to the first node A. The second transistor T2 is turned on under the control of the first scan signal terminal Scan1, and outputs the voltage of the first signal terminal Vq to the first node A.

Figure 2:
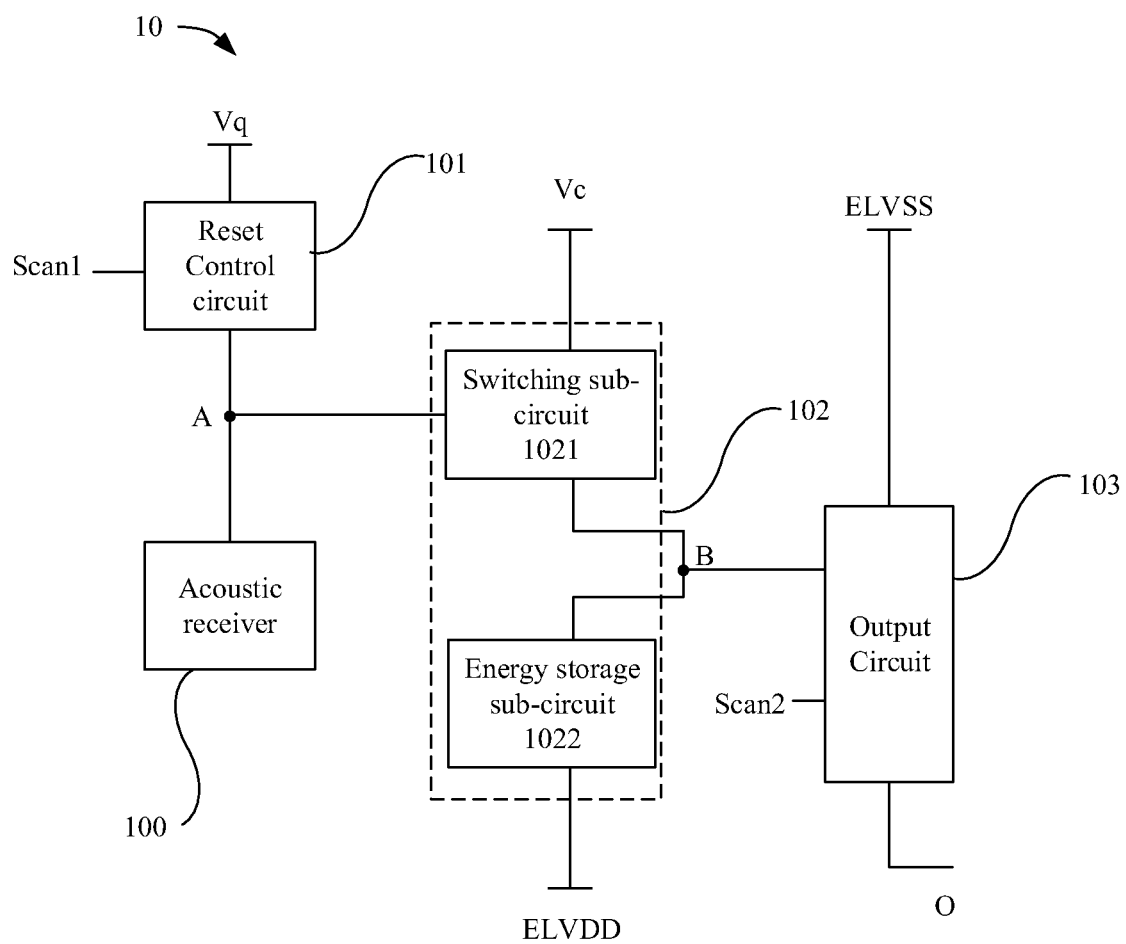
FIG. 2 shows a schematic structural diagram of another acoustic wave signal reading circuit according to an embodiment of the present application.

The function circuit 102 is shown in FIG. 2. The function circuit 102 can include a switching sub-circuit 1021 and an energy storage sub-circuit 1022.

The switching sub-circuit 1021 is coupled to the first node A, the second signal terminal Vc, and the second node B.

The switching sub-circuit 1021 is configured to switch states under the control of the first node A, the second signal terminal Vc, and the second node B. The switching sub-circuit 1021 switches between a first state and a second state.

The energy storage sub-circuit 1022 is coupled to the first voltage terminal ELVDD and the second node B.

The function circuit 102 clears charge stored in the energy storage sub-circuit 1022 when the switching sub-circuit 1021 is in the first state to reset the second node B. The function circuit 102 charges the energy storage sub-circuit 1022 and amplifies the potential of the first node A to output to the second Node B when the switching sub-circuit 1021 is in the second state.

Therefore, the function circuit 102 realizes different functions at different stages by switching states of switching sub-circuit 1021 between the first state and the second state. Schematically, these states can be represented in two phases. As described herein below, in a reset phase S1, the voltage of the second signal terminal Vc is output to the second node B to reset the second node B. In the acquisition phase S2, the potential of the first node A is amplified, and output to the second node B.

Specifically, in the reset phase S1, the switching sub-circuit 1021 is in the first state, and the charge stored in the energy storage sub-circuit 1022 is cleared to reset the second node B. In the acquisition phase S2, the switching sub-circuit 1021 is in the second state, and the function circuit 102 amplifies the potential of the first node A and outputs the amplified potential to the second node B for subsequent signal acquisition. The energy storage sub-circuit 1022 is simultaneously charged during the acquisition phase S2.

As shown in FIG. 3, the switching sub-circuit 1021 may include: a first transistor T1 comprising a gate coupled to the first node A, a first pole coupled to the second signal terminal Vc, and a second pole coupled to the second node B.

The energy storage sub-circuit 1022 includes a storage capacitor Cst. A first end of the storage capacitor Cst is coupled to the second node B, and a second end is coupled to the first voltage terminal ELVDD.

In the reset phase S1, the voltage of the second signal terminal Vc is output to the first node A through the first transistor T1 and a charge in the storage capacitor Cst is cleared to reset the second node B. Based on this, it will be understood by those skilled in the art that in the reset phase S1, the first transistor T1 is in a variable resistance region (which can be considered as the aforementioned first state), and is used as a switch. It can also be understood that the storage capacitor Cst empties internal charge at this stage and there is a period in which the voltage of the second signal terminal Vc is equal to the voltage of the first voltage terminal ELVDD to ensure that the charge in the storage capacitor Cst is emptied.

In the acquisition phase S2, the potential of the first node A can be amplified by the first transistor T1 and can be output to the second node B. It can be understood that the first transistor T1 may be in a saturation region (which can be considered as the aforementioned second state). The drain current may not vary with a source-drain voltage for the first transistor T1 in the saturation region and may only depend on the gate-source voltage. This relationship can be represented as the formula: $I_d = K_n(V_{gs} - V_{th})^2$ where, is conductive and the constant is the threshold voltage.

Figure 4:
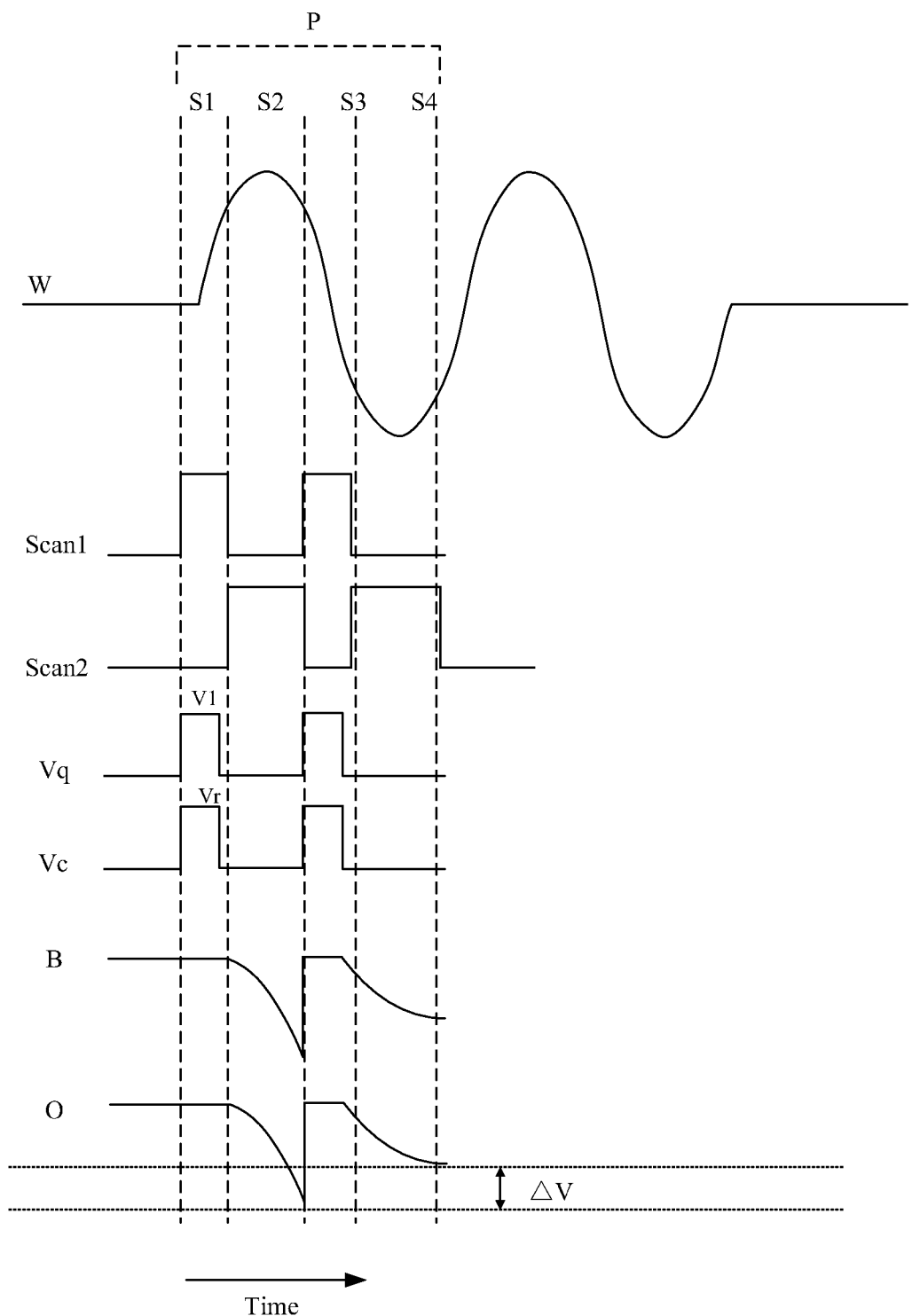
FIG. 4 shows a control timing diagram of an acoustic wave signal reading circuit according to an embodiment of the present application.

Based on this, in the acquisition phase S2, the first transistor T1 may be maintained in the saturation region and the potential of the first node A can be amplified and output to the second node B. This output will lower the potential at the second node B and simultaneously store charge on the storage capacitor Cst. The lowering of the potential at the second node B is depicted in FIG. 4.

It can also be understood that the potential of the first node A in the acquisition phase S2 is an acoustic signal converted to an electric signal by the acoustic wave receiver 100. The design of the acoustic wave receiver 100 and the acoustic wave reading circuit 10 can be based on the range of an anticipated acoustic signal. As one example, the transistor T1 and the voltage of the first signal terminal Vq are chosen to ensure that the first transistor T1 can be in the saturation region when required.

The output circuit is shown in FIG. 3. The output circuit 103 can include a third transistor T3 and a fourth transistor T4. A gate of the third transistor T3 is coupled to the second node B, a first pole of the third transistor T3 is coupled to the second voltage terminal ELVSS, and a second pole of the third transistor T3 is coupled to a first pole of the fourth transistor T4.

A gate of the fourth transistor T4 is coupled to a second scan signal terminal Scan2 and a second pole of the fourth transistor T4 is coupled to the signal read terminal O. It can be understood that the fourth transistor T4 serves as a gate switch. Other methods may also be substituted for the fourth transistor T4.

Specifically, in a state where the fourth transistor T4 is turned on, the third transistor T3 acts as a voltage follower to track the potential of the second node B. The fourth transistor T4 outputs a signal to the signal read terminal O. It can be understood that the potential of the first node A corresponds to the electrical signal converted from the received acoustic wave signal and is amplified and output to the second node B. The third transistor T3 acts as a voltage follower to output the converted acoustic signal through the function circuit 102. It is understood that the amplified electrical signal of the converted acoustic signal does not change the actual generated noise, which is equivalent to enhancing the anti-noise ability of the converted acoustic signal. Thereby, the acoustic wave signal reading circuit 10 ensures that the reading through the signal read terminal O has a high precision.

It can also be understood that the first pole of the third transistor T3 may be a source and the second pole of the third transistor T3 may be a drain. In some examples, the first pole of the third transistor T3 may be a drain and the second pole of the third transistor T3 may be a source. The configuration of source and drain is not limited in the present application. Further, the acoustic wave signal reading circuit 10 in the present application may be designed based on a glass substrate and a thin film transistor as described above but is not limited thereto.

An embodiment of the present application further provides a control method of an acoustic wave signal reading circuit, such as the acoustic wave signal reading circuit 10, which further describes the working phase of each circuit in the acoustic wave signal reading circuit, and simultaneously refers to the control timing diagram in FIG. 4 and the configuration depicted in FIG. 3. An on/off state of each transistor in the acoustic wave signal reading circuit will be further described in detail.

It should be noted that, in an embodiment of the present application, the first voltage terminal ELVDD is a high voltage input, and the second voltage terminal ELVSS is at a low voltage or ground. Transistors of the acoustic wave signal reading circuit are turned on and off in the embodiment. The embodiments are described as if all transistors are N-type. However, all transistors may also be P-type and can be described by flipping all control signals described herein.

Specifically, the control method of the acoustic wave signal reading circuit includes at least one reset phase S1 and at least one acquisition phase S2.

Figure 7:
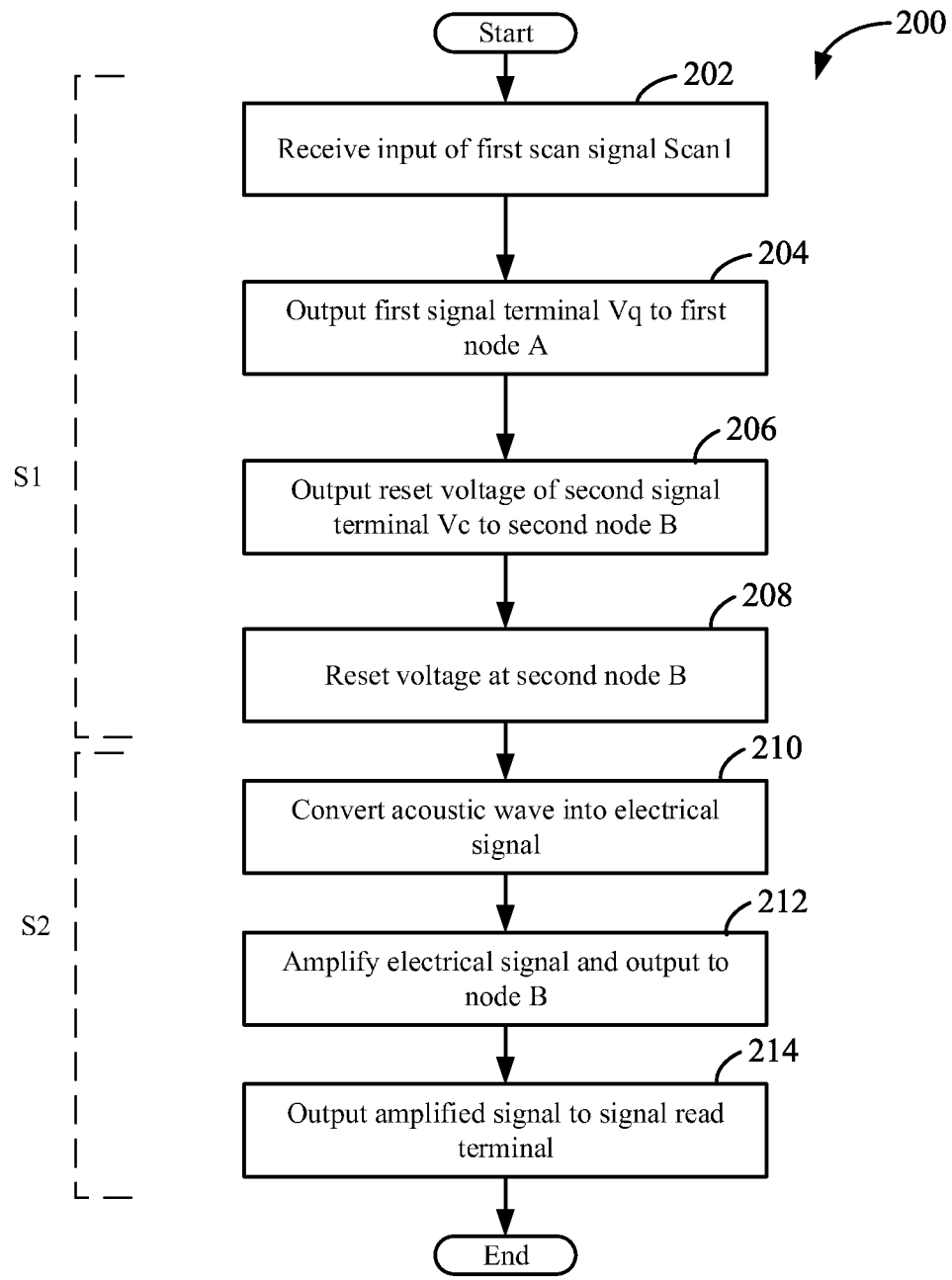
FIG. 7 shows a flow chart of a control method for an acoustic wave signal reading circuit according to an embodiment of the present application.

In the reset phase S1, a first scan signal is input to the first scan signal terminal Scan1 to turn on the reset control circuit 101, wherein a received first voltage V1 input from the first signal terminal Vq is output to the first node A. These steps of the reset phase S1 are shown as steps 202 and 204 in FIG. 7.

The reset phase S1 further includes inputting a reset voltage Vr to the second signal terminal Vc, and outputting the reset voltage Vr to the second node B through the function circuit 102. This step of the reset phase S1 is shown as step 206 in FIG. 7. The function circuit 102 is controlled by the first node A and the first voltage terminal ELVDD.

Specifically, referring to FIG. 3 in conjunction with FIG. 4, under the control of the first scan signal input at the first scan signal terminal Scan1, the second transistor T2 is turned on, and the first voltage V1 is output to the first Node A. The first voltage V1 is input by the first signal terminal Vq. Under the control of the first node A, the first transistor T1 is turned on and is in the variable resistance region. The first transistor T1 being turned on in the variable resistance region places the switching sub-circuit 1021 in the first state. The second signal terminal Vc outputs the reset voltage Vr to the second node B. The reset voltage Vr may be a high potential. During this phase, the voltage of the first voltage terminal ELVDD may be equal to the reset voltage Vr and therefore, the voltage across the storage capacitor Cst is equal. The charge stored in the storage capacitor Cst is emptied, thereby achieving the purpose of resetting the second node B. The resetting of the second node B in the reset phase S1 is shown as step 208 in FIG. 7.

In the acquisition phase S2, the acoustic wave receiver 100 converts the received acoustic wave signal into an electrical signal and outputs it to the first node A. This step of the acquisition phase S2 is shown as step 210 in FIG. 7.

It can be understood that, as long as there is an acoustic wave signal, the acoustic wave receiver 100 converts the received acoustic wave signal into an electrical signal and outputs it to the first node A. However, the potential of the first node A may be clamped in the reset phase S1 by the first voltage V1 at the first signal terminal Vq. The clamping prevents the electrical signal converted by the acoustic wave receiver 100 in the reset phase S1 from affecting the potential of the first node A.

In the acquisition phase S2, the voltage of the terminal Vq drops to a low potential, and the potential of the first node A is mainly an electrical signal converted by the acoustic wave receiver 100. One of ordinary skill in the art would understand that the low potential of the first signal terminal Vq weakly couples to the converted electrical signal.

In the acquisition phase S2, under the control of the second signal terminal Vc and the first voltage terminal ELVDD, the function circuit 102 amplifies the electrical signal of the first node A and outputs the amplified signal to the second node B. This step of the acquisition phase S2 is shown as step 212 in FIG. 7. Under the control of the second voltage terminal ELVSS, the output circuit 103 outputs a following voltage of the second node B to the signal read terminal O. This step of the acquisition phase S2 is shown as step 214 in FIG. 7.

Specifically, referring to FIG. 3 and in conjunction with FIG. 4, in the acquisition phase S2, the voltage of the second signal terminal Vc drops to a low potential. Under the control of the first node A (corresponding to the electrical signal of the received acoustic wave signal), the first transistor T1 is in the saturation region and, therefore, the switching sub-circuit 1021 is in the second state in the acquisition phase S2. The potential of the second node B decreases from the high potential of the reset phase S1 and the storage capacitor Cst starts to be charged. The potential of the first node A is passed through the first transistor T1, amplified, and output to the second node B in the acquisition phase S2. The control timing diagram of FIG. 4 shows the potential of the second signal terminal Vc dropping in the acquisition phase S2. The potential of the second node B and the signal read terminal O are depicted to be decreasing in the acquisition phase S2 of FIG. 4.

Further during the acquisition phase S2, the fourth transistor T4 is turned on under the control of the second scan signal input by the second scan signal terminal Scan2 and the third transistor T3 follows the voltage of the second node B as a voltage follower. This following voltage is output to the signal read terminal O.

It can be understood that the fourth transistor T4 can be a conventional switching transistor. In the acquisition phase S2, the second scan signal input through the second scan signal terminal Scan2 turns on the third transistor T3 and the third transistor T3 becomes saturated. The third transistor T3 follows the voltage of the second node B as a voltage follower when in a saturated state. A voltage following may be equivalent to a voltage follow-up or, in other words, the voltages of the signal read terminal O and the second node B may be equal. The voltage of the signal read terminal O can be proportionally amplified. The present application does not limit amplification of the signal read voltage and the third transistor T3 can be chosen to meet a wide variety of design needs such as amplification.

The reset voltage Vr must be controlled to ensure that it does not affect a subsequent acquisition phase such as S4 which would negatively affect an accuracy of the measurement. FIGS. 3 and 4 depict the switching sub-circuit 1021 switching to the second state before entering the acquisition phase S2. Specifically, near the end of the reset phase S1, the voltage V1 input to the first signal terminal Vq and the reset voltage Vr input to the second signal terminal Vc decrease from a high level before entering the acquisition phase S2. This voltage drop can be seen preceding the dashed line depicting the transitions from the reset phase S1 to the acquisition phase S2 in FIG. 4. These decreases ensure that the first transistor T1 enters the acquisition phase S2 from the reset phase S1. The variable resistance region of the first transistor T1 is switched to the saturation region, thereby ensuring that the input signal (e.g., the reset voltage Vr) of the second signal terminal Vc does not affect the acquisition phase S2 when entering the acquisition phase S2. This voltage drop therefore ensures the stability and accuracy of the acquired signal.

The above control method is a control process of the acoustic wave signal reading circuit at different stages. It can be understood that, in the case where the application scenarios of the acoustic wave signal reading circuit are different, the reading of the acoustic wave signal in the above control process may have appropriate adjustments.

Illustratively, in some embodiments, the acoustic wave signal reading circuit can be used as an ultrasonic reading circuit in the field of ultrasonic touch. In this case, it can be understood that in the field of ultrasonic touch, the emission is generally peaks of a standing wave, shown in the acquisition phase S2 of FIG. 4, and the valleys, shown in the acquisition phase S4. The standing wave W is composed of an ultrasonic wave and a reflected echo is respectively detected. A difference between a signal of a detected peak position, or peak region signal, and of a valley position, or valley region signal, is detected. This difference value is used to determine an actual touch position or fingerprint pattern.

In an embodiment of the control method of the acoustic wave signal reading circuit, the peak region signal and the valley region signal of the acoustic wave signal can be separately read during different acquisition phases. In this case, different acquisitions are necessary. Before a given acquisition phase, a corresponding reset phase is performed separately.

For example, referring to FIG. 4, the acoustic wave receiver (e.g., 100) reads a signal of a peak and a valley in a standing wave W composed of a transmitted ultrasonic wave and a reflected echo. An acoustic wave signal reading period P includes: the reset phase, or first reset phase, S1; the acquisition phase, or first acquisition phase, S2; the reset phase, or second reset phase, S3; and the acquisition phase, or second acquisition phase, S4; that are sequentially set.

The two acquisition phases in the acoustic wave signal reading period P of a first acoustic wave signal are: the first acquisition phase S2 and the second acquisition phase S4, respectively. In the first acquisition phase S2, the acoustic wave receiver converts the peak region signal of the received acoustic wave signal into a first electrical signal which is output to the first node (e.g., A). In the second acquisition phase S4, the acoustic wave receiver (e.g., 100) converts the valley region signal of the acoustic wave signal into a second electrical signal which is output to the first node A.

An embodiment of the control method for the acoustic wave signal reading circuit specifically includes one reset phase during one acoustic wave signal reading period P. Referring to FIG. 3 for depiction of the components, the first scan signal is input to the first scan signal terminal Scan1 to turn on the reset control circuit 101. The first voltage V1 is input at the first signal terminal Vq and is output to the first node A. The reset voltage Vr is input at the second signal terminal Vc and is output to the second node B. The reset voltage Vr is output through the function circuit 102 under the control of the first node A and the first voltage terminal ELVDD, to reset the second node B.

In the first acquisition phase S2, the acoustic wave receiver 100 converts the peak region signal of the received acoustic wave signal into the first electrical signal which is output to the first node A. Under the control of the second signal terminal Vc and the first voltage terminal ELVDD, the function circuit 102 amplifies the first electrical signal of the first node A and outputs the amplified signal to the second node B. Under the control of the second voltage terminal ELVSS, the output circuit 103 outputs the following voltage of the second node B to the signal read terminal O.

In the second reset phase S3, the first scan signal is input to the first scan signal terminal Scan1 to turn on the reset control circuit 101, and an input of the first voltage V1 to the first signal terminal Vq and is output to the first node A. The reset voltage Vr is input to the second signal terminal Vc, and is output to the second node B through the function circuit 102 under the control of the first node A and the first voltage terminal ELVDD. These actions function to reset the second node B.

In the second acquisition phase S4, the acoustic wave receiver 100 converts the valley region signal of the received acoustic wave signal into the second electrical signal which is output to the first node A. Under the control of the second signal terminal Vc and the first voltage terminal ELVDD, the function circuit 102 amplifies the second electrical signal of the first node A and outputs the amplified signal to the second node B. Under the control of the second voltage terminal ELVSS, the output circuit 103 outputs the following voltage of the second node B to the signal read terminal O.

It should be noted that the peak region signal of the above acoustic wave, as referred to herein, includes a peak and a certain region on both sides of the peak. Likewise, the valley region signal of the acoustic wave includes a valley and a certain region on both sides of the valley. The peak region signal and the valley region signal of the standing wave W can be seen in the acquisition phases S2 and S4 of FIG. 4. The size of the peak region and the valley region will be adjusting according to the needs of the application. It is also understandable that a frequency of the acoustic wave signal will likely be known for an application, so that the first acquisition stage S2 and the second acquisition stage S4 are positioned in the peak region and the valley region of the acoustic wave signal, respectively. An embodiment featuring this positioning is depicted in FIG. 4 but other positioning of the acquisition phase or phases is also possible.

Embodiments of the control method may further include: acquiring a voltage value of the corresponding peak region signal at the signal read terminal O in the first acquisition phase S2, acquiring a corresponding voltage value of the corresponding valley region signal at the signal read terminal O in the second acquisition phase S4, and calculating a difference $\Delta V$ of the voltage values. The difference $\Delta V$ between the voltage values can be used to quantify a received acoustic signal.

It can be understood that the voltage value of the corresponding peak region signal refers to a maximum absolute voltage among the voltages read at the signal read terminal O in the first acquisition phase S2. The voltage of the peak region signal may be determined by a maximum voltage difference between voltages read in the first acquisition phase S2 and a voltage read in a corresponding reset phase (e.g., S1). A voltage value of the corresponding valley region signal is a voltage read at the signal read terminal O in the second acquisition phase S4 having a maximum absolute voltage. The voltage of the valley region signal may be determined by a maximum voltage difference between voltages read in the second acquisition phase S4 and a voltage read in the corresponding reset phase (e.g., S3).

Based on this, in some embodiments, when the acoustic wave signal reading circuit is utilized in a fingerprint recognition device, the reflection intensity of the acoustic wave signal is different due to valleys and ridges of a finger. Thus, a control method, such as the one described above, can be used to identify the valleys and the ridges of the finger by determining differences between voltage values read at the signal read terminal O during different acquisition phases S2.

The signals may be collected in any order. A sequence of the depicted first acquisition phase S2 for collecting the peak region signal of the acoustic wave signal and the second acquisition phase S2' for collecting the valley region signal of the acoustic wave signal is shown for exemplary purposes. A signal collected in the valley region may be first performed followed by a signal collected in the peak region. The present application is not limited to any particular order of collection or acquisition.

In addition, FIG. 4 is only an illustration of a standing wave period as an example, and the control method of the present application is described in reference to this example. It can be understood that the actual control method is a process of sequentially performing multiple cycles of detection in each of the above stages. For the on/off, state adjustment, and signal adjustment of the transistor, refer to the corresponding parts in the foregoing embodiment.

Embodiments where the first acquisition phase S2 and the second acquisition phase S4 are received during one acoustic wave signal reading period P may exhibit increased detection efficiency and accuracy of the detection result. In such embodiments, the peak region signal and the valley region signal of the acoustic wave signal are located in the same period of the acoustic wave signal. However, other arrangements of acquisition phases and periods are also possible.

In addition, an embodiment of the present application further provides an acoustic wave signal reading apparatus comprising one or more acoustic wave signal reading circuits according to one of the embodiments discussed above. The acoustic wave signal reading circuit of the acoustic wave signal reading apparatus may have structures and advantageous effects similar to the acoustic wave signal reading circuit provided in the foregoing discussion. Since the foregoing embodiment has described the structure and advantageous effects of the acoustic wave signal reading circuit in detail, it will not be described again herein.

Figure 5:
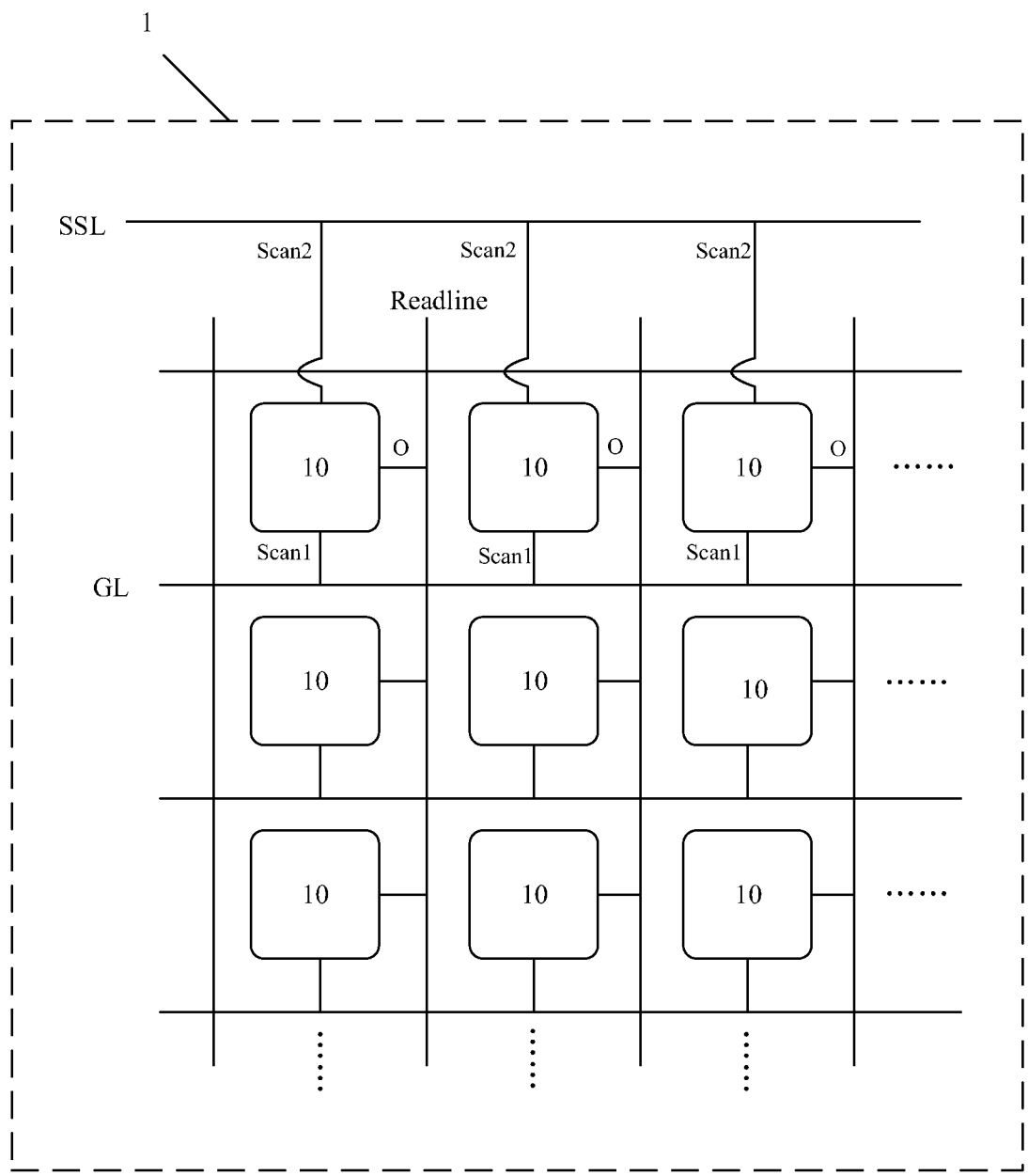
FIG. 5 shows a schematic diagram of a distribution of a read circuit in an acoustic wave signal reading apparatus according to an embodiment of the present application.

In some embodiments, the acoustic wave signal reading apparatus may be a fingerprint recognition device. In some embodiments, the acoustic wave signal reading apparatus may be an ultrasonic touch device. For example, the ultrasonic touch device may be used to acquire a fingerprint image. The present application is not limited to touch control. The corresponding acoustic wave signal reading circuit may be set according to an application of the ultrasonic touch device. Ultrasonic touch devices frequently provide a plurality of acoustic wave signal reading circuits 10 arranged in a matrix as shown in FIG. 5. The plurality of acoustic wave signal reading circuits 10 may be oriented along two axes, such as x and y axes as shown in FIG. 5. A first scan signal terminal Scan1 of each of the plurality of acoustic wave signal reading circuits 10 may be coupled to a first scan line GL. Signal read terminals O of a plurality of acoustic wave signal reading circuits 10 in the same column may be coupled to a read signal line Readline. Other configurations of connections to scan lines (e.g., GL) and read lines (e.g., Readline) are also possible without departing from the scope of the application.

Acoustic wave signal reading circuits 10 provided with a second scanning signal terminal Scan2 may be connected to a second scanning line SSL. In one embodiment, the second scanning signal terminals Scan2 located in a plurality of acoustic wave signal reading circuits in the same row are coupled to a same second scanning line SSL.

Figure 6:
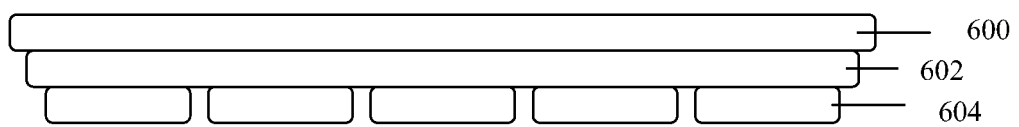
FIG. 6 shows a schematic structural diagram of an acoustic wave receiver in an acoustic wave signal reading apparatus according to an embodiment of the present application.

In an ultrasonic touch device, the acoustic wave receiver in the acoustic wave signal reading circuit may be an ultrasonic transducer. Ultrasonic transducers frequently include an anode and a cathode, and a pressure sensitive material between the anode and the cathode. One embodiment, shown in FIG. 6, depicts a glass-based ultrasonic device with a sandwich structure. The top layer is a full face metal electrode 600, the middle layer is a piezoelectric polyvinylidene difluoride (PVDF) material 602, and the bottom layer is a pixel arrangement 604 of acoustic wave signal reading circuits 10 for receiving and amplifying ultrasonic signals. Other embodiments may include an arrangement 604 of ultrasonic transducers including a plurality of acoustic wave signal reading circuits 10 arranged in a matrix.

A person skilled in the art will understand that all, or part, of the steps of implementing the above method embodiments may be completed by using hardware related to the program instructions. For example, an acoustic wave reading apparatus 1, as depicted in FIG. 1, may include an integrated circuit 50 connected to the Readline. The integrated circuit 50 may include a processor 52 connected to a memory 54. The memory 54 may include instructions 56 and the instructions 56 may include steps for carrying out the control methods described above or other embodiments of control methods within the scope of this application. The memory, or storage medium, 54 may include a medium that can store program codes, such as a read-only memory (ROM), a random-access memory (RAM), a magnetic disk, or an optical disk.

The described embodiments are only discussed for exemplary purposes. The scope of the present application is not limited to the described embodiments. A person skilled in the art can easily envision changes or substitutions within the technical scope of the present application.

REFERENCE LABELS

1—acoustic wave signal reading apparatus;
10—acoustic wave signal reading circuit;
100—acoustic receiver;
101—reset control circuit;
102—function circuit;
1021—switching sub-circuit;
1022—energy storage sub-circuit;
103—output circuit;
A—first node;
B—second node;
O—signal read terminal;
ELVDD—first voltage terminal;
ELVSS—second voltage terminal;
Vq—first signal terminal;
Vc—second signal terminal;
Scan1—first scan signal terminal;
Scan2—second scan signal terminal;
Cst—storage capacitor;
T1—first transistor;
T2—second transistor;
T3—third transistor;
T4—four transistor;
W—standing wave;
Readline—read signal line;
GL—scan line;
Vr—reset voltage;
V1—first voltage;
S1—reset phase;
S2—acquisition phase;
S3—second reset phase;
S4—second acquisition phase;
P—acoustic wave signal reading period;
50—integrated circuit;
52—processor;
54—memory;
56—instructions.

The invention claimed is:
1. An acoustic wave signal reading circuit, comprising:
an acoustic wave receiver,
a reset control circuit,
a function circuit, and
an output circuit;
wherein the acoustic wave receiver is coupled to a first node and the acoustic wave receiver is configured to convert a received acoustic wave signal into an electrical signal and output the electrical signal to the first node;
wherein the reset control circuit is coupled to the first node, a first scan signal terminal, and a first signal terminal, and the reset control circuit is configured to output a voltage of the first signal terminal to the first node under the control of the first scan signal terminal;
wherein the function circuit is coupled to the first node, a second node, a second signal terminal, and a first voltage terminal, and the function circuit switches states based on the first node, the second signal terminal, and the first voltage terminal;
wherein the function circuit outputs a voltage of the second signal terminal to the second node to reset the second node or amplifies a potential of the first node and outputs the amplified potential to the second node depending on a state of the function circuit; and
wherein the output circuit is coupled to the second node and a signal read terminal and the output circuit outputs a following voltage of the second node to the signal read terminal.

2. The acoustic wave signal reading circuit according to claim 1, wherein the function circuit comprises:
a switching sub-circuit and an energy storage sub-circuit;
wherein the switching sub-circuit is coupled to the first node, the second signal terminal, and the second node, the switching sub-circuit switches between a first state and a second state, and the switching sub-circuit is controlled by the first node, the second signal terminal, and the second node;
wherein the energy storage sub-circuit is coupled to the first voltage terminal and the second node;
wherein the function circuit clears a charge stored in the energy storage sub-circuit to reset the second node under control of the switching sub-circuit in the first state and the first voltage terminal; and
wherein the energy storage sub-circuit is charged and the potential of the first node is amplified and output to the second node under control of the switching sub-circuit in the second state and the first voltage terminal.

3. The acoustic wave signal reading circuit according to claim 2, wherein the switching sub-circuit includes:
a first transistor comprising a gate coupled to the first node, a first pole coupled to the second signal terminal, and a second pole coupled to the second node;
wherein the energy storage sub-circuit includes:
a storage capacitor comprising a first end coupled to the second node and a second end coupled to the first voltage terminal.

4. The acoustic wave signal reading circuit according to claim 3, wherein the reset control circuit includes a second transistor comprising a gate coupled to the first scan signal terminal, a first pole coupled to the first signal terminal, and a second pole coupled to the first node.

5. The acoustic wave signal reading circuit according to claim 4, wherein the output circuit includes:
a third transistor comprising a gate coupled to the second node, a first pole coupled to the second voltage terminal, and a second pole coupled to a first pole of a fourth transistor; and
the fourth transistor comprising a gate coupled to a second scan signal terminal, and a second pole coupled to the signal read terminal.

6. A control method for an acoustic wave signal reading circuit, wherein the control method comprises:
   a reset phase comprising:
      inputting a first scan signal to a first scan signal terminal to turn on a reset control circuit and outputting a first voltage input of a first signal terminal to a first node;
      inputting a reset voltage to a second signal terminal and outputting the reset voltage to a second node under control of the first node and a first voltage terminal to reset the second node via a function circuit; and
   an acquisition phase comprising:
      an acoustic wave receiver converting a received acoustic wave into an electrical signal and outputting the electrical signal to the first node;
      the function circuit amplifying the electrical signal of the first node and outputting the signal to the second node controlled by the second signal terminal and the first voltage terminal; and
      an output circuit outputting a following voltage of the second node to a signal read terminal under control of the second voltage terminal.

7. The control method according to claim 6, wherein the reset phase, the acquisition phase, a second reset phase, and a second acquisition phase are sequentially performed in an acoustic wave signal reading period; and
   in the first acquisition phase, the acoustic wave receiver converts a peak region signal of the received acoustic wave into a first electrical signal and outputs the first electrical signal to the first node; and
   in the second acquisition phase, the acoustic wave receiver converts a valley region signal of the received acoustic wave into a second electrical signal and outputs the second electrical signal to the first node.

8. The control method according to claim 7, wherein the control method further comprises:
   obtaining a difference between voltage values of the peak region signal read by the signal read terminal in the first acquisition phase and the valley region signal read by the signal read terminal in the second acquisition phase.

9. The control method according to claim 7, wherein during the acoustic wave signal reading period, the peak region signal and the valley region signal of the acoustic wave respectively received during the first acquisition phase and the second acquisition phase are located in a same period of the received acoustic wave.

10. The control method according to claim 6, further comprising:
   during the reset phase, clearing a charge from an energy storage sub-circuit of the function circuit to reset the second node when a switching sub-circuit of the function circuit is in a first state under control of the first node, and a reset voltage input at the second signal terminal is equal to a first voltage of the first voltage terminal;
   switching sub-circuit switching to a second state under control of the first node; and
   during the acquisition phase, amplifying and outputting the electrical signal of the first node to the second node.

11. The control method according to claim 10, wherein switching the switching sub-circuit from the first state to the second state occurs before the acquisition phase.

12. An acoustic wave signal reading apparatus comprising the acoustic wave signal reading circuit according to claim 1, wherein the acoustic wave receiver in the acoustic wave signal reading circuit is an ultrasonic transducer.

13. The acoustic wave signal reading apparatus according to claim 12, wherein the acoustic wave signal reading apparatus is an ultrasonic touch device, and the ultrasonic touch device includes:
   a plurality of the acoustic wave signal reading circuits arranged in a matrix;
   wherein all first scan signal terminals of the acoustic wave signal reading circuits located in a same row are coupled to a first scanning line; and
   wherein all signal read terminals of the acoustic wave signal reading circuits located in a same column are coupled to a read signal line.

14. The acoustic wave signal reading apparatus according to claim 12, wherein the acoustic wave signal reading apparatus is configured for fingerprint recognition.

15. An acoustic wave signal reading apparatus comprising the acoustic wave signal reading circuit according to claim 1.

16. An acoustic wave signal reading apparatus comprising an acoustic wave signal reading circuit, the acoustic wave signal reading circuit comprising:
   an acoustic wave receiver configured to convert a received acoustic wave signal into an electrical signal and output the electrical signal to a first node,
   a reset control circuit configured to output a voltage of a first signal terminal to the first node under the control of a first scan signal terminal
   a function circuit configured to switch states based on the first node, a second signal terminal, and a first voltage terminal, and the function circuit configured to output a voltage of the second signal terminal to a second node in a first state, or amplify a potential of the first node and output the amplified potential to the second node in a second state; and
   an output circuit configured to output a following voltage of the second node to the signal read terminal.

17. The acoustic wave signal reading apparatus according to claim 16, wherein the function circuit comprises:
   a switching sub-circuit configured to switch between a first state and a second state, and the switching sub-circuit controlled by the first node, the second signal terminal, and the second node; and
   an energy storage sub-circuit, the energy storage sub-circuit being charged and the potential of the first node being amplified and output to the second node under control of the switching sub-circuit in the second state and the first voltage terminal.

18. The acoustic wave signal reading apparatus according to claim 17, wherein the switching sub-circuit includes:
   a first transistor comprising a gate coupled to the first node, a first pole coupled to the second signal terminal, and a second pole coupled to the second node; and
   wherein the energy storage sub-circuit includes:
      a storage capacitor comprising a first end coupled to the second node and a second end coupled to the first voltage terminal.

19. The acoustic wave signal reading apparatus according to claim 18, wherein the reset control circuit includes a second transistor comprising a gate coupled to the first scan signal terminal, a first pole coupled to the first signal terminal, and a second pole coupled to the first node.

20. The acoustic wave signal reading apparatus according to claim 19, wherein the output circuit includes:
   a third transistor comprising a gate coupled to the second node, a first pole coupled to the second voltage terminal, and a second pole coupled to a first pole of a fourth transistor; and the fourth transistor comprising a gate coupled to a second scan signal terminal, and a second pole coupled to the signal read terminal.

\* \* \* \* \*